US012695754B2

(12) United States Patent
Jeyakumar et al.

(10) Patent No.: US 12,695,754 B2
(45) Date of Patent: Jul. 28, 2026

(54) AUTOMATIC RESPONSIVE GENERATIVE REPORTING

(71) Applicant: Abnormal AI, Inc., Las Vegas, NV (US)

(72) Inventors: Sanjay Jeyakumar, El Cerrito, CA (US); Abhijit Bagri, Atlanta, GA (US); Mickey Dang, New York City, NY (US); Shrivastava Shankar, San Francisco, CA (US)

(73) Assignee: Abnormal AI, Inc., Las Vegas, NV (US)

( * ) Notice: Subject to any disclaimer, the term of this patent is extended or adjusted under 35 U.S.C. 154(b) by 76 days.

(21) Appl. No.: 18/947,623

(22) Filed: Nov. 14, 2024

(65) Prior Publication Data

US 2026/0135849 A1     May 14, 2026

(51) Int. Cl.
  *H04L 9/40* (2022.01)
  *G06F 16/2455* (2019.01)
(52) U.S. Cl.
  CPC ........ *H04L 63/101* (2013.01); *G06F 16/2455* (2019.01)
(58) Field of Classification Search
  CPC ........................... H04L 63/101; G06F 16/2455
  See application file for complete search history.

(56) References Cited

U.S. PATENT DOCUMENTS

| | | | | |
|---|---|---|---|---|
| 10,382,368 B2 * | 8/2019 | Niu | ........................ | G06F 40/143 |
| 10,498,678 B2 * | 12/2019 | Murtagh | ................. | H04L 51/10 |
| 10,659,399 B2 * | 5/2020 | Foerster | ................. | G06N 20/00 |
| 10,733,529 B1 * | 8/2020 | Tran | ........................ | H04L 51/04 |
| 10,924,444 B2 * | 2/2021 | Hum | ........................ | G06Q 10/40 |
| 11,509,620 B2 * | 11/2022 | Zhang | ..................... | H04L 51/48 |
| 2024/0311740 A1 * | 9/2024 | Shriwas | ................. | G06Q 10/10 |
| 2025/0095096 A1 * | 3/2025 | Zadeh | ................... | G06F 40/197 |
| 2025/0260707 A1 * | 8/2025 | Belgi | ................. | H04L 63/1433 |

* cited by examiner

*Primary Examiner* — Viral S Lakhia
(74) *Attorney, Agent, or Firm* — Van Pelt, Yi & James LLP

(57) ABSTRACT

A report message including a machine generated security report is provided. A reply message to the report message is received, wherein the reply message includes an inquiry. Data associated with the inquiry and determined to be accessible with a security privilege of a sender of the reply message is retrieved. A machine learning language model query is automatically generated using the retrieved data and at least a portion of the generated security report. A second report generated by a machine learning language model executed in response to the machine learning language model query is received. The second report is provided as a response to the reply message in a responsive message from an artificial intelligence service.

20 Claims, 12 Drawing Sheets

830

AUTOMATIC RESPONSIVE GENERATIVE REPORTING

BACKGROUND OF THE INVENTION

Security services can protect systems through a variety of means including by detecting, preventing, and responding to security threats. They can perform multiple security functions such as threat detection, incident response, security analytics, and others. However, due to the increasing complexity of both security threats and the systems they attack, managing and deploying security solutions efficiently and effectively has become increasingly challenging. Therefore, there exists a need for improved reporting tools for managing and optimizing security solutions.

BRIEF DESCRIPTION OF THE DRAWINGS

Various embodiments of the invention are disclosed in the following detailed description and the accompanying drawings.

DETAILED DESCRIPTION

Figure 1:
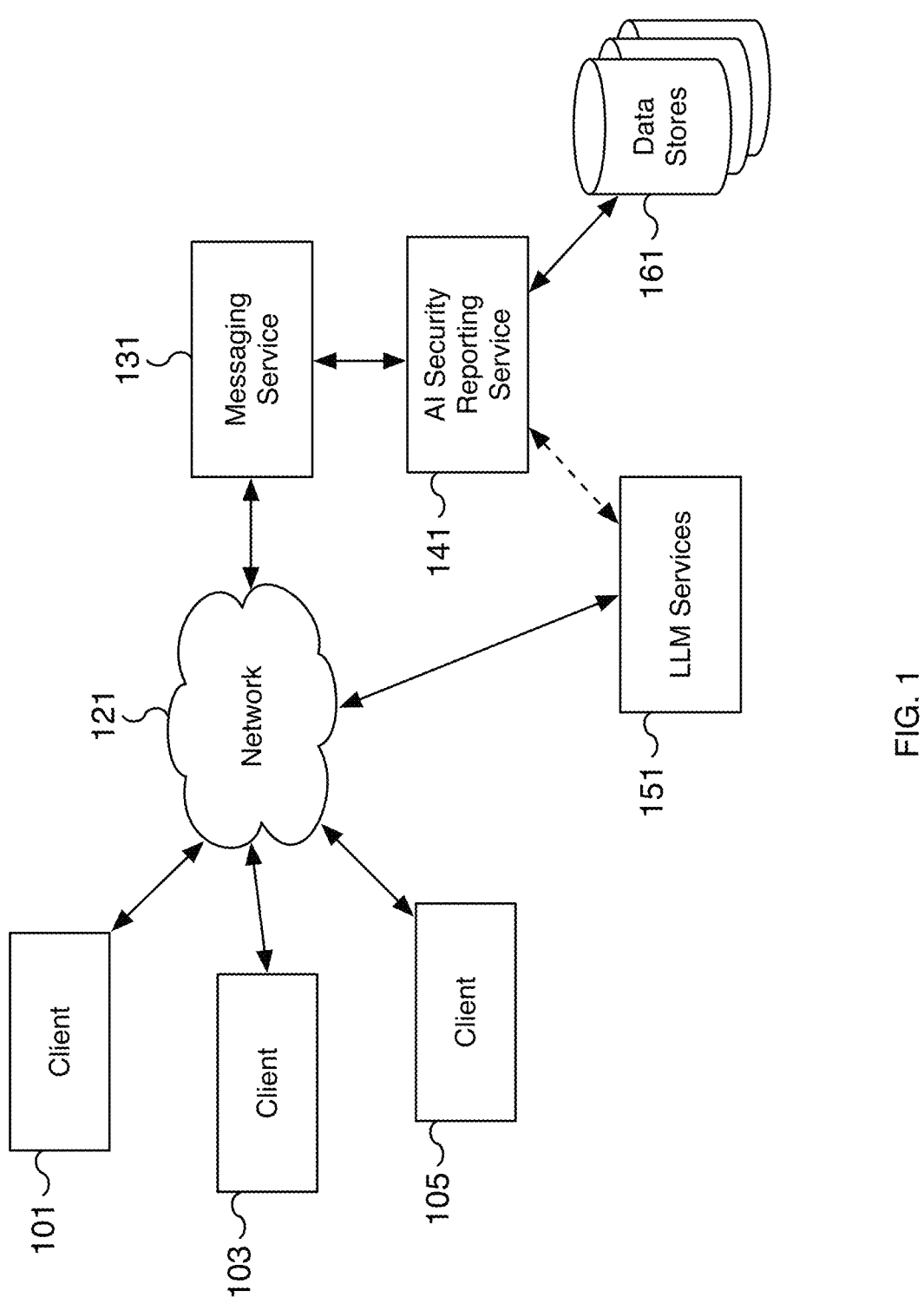
FIG. 1 is a block diagram illustrating an embodiment of a computing infrastructure for an artificial intelligence (AI) security reporting service.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The automatic generation of responsive security reporting is disclosed. For example, a user such as an information security officer can provide a security-related inquiry to a security reporting service. The disclosed security reporting service can analyze the inquiry and automatically generate a report that addresses the user's inquiry. The responsive machine generated report can include specific details including security analytics and metrics to address the inquiry while enforcing that the included content is scoped to the security privileges of the user. In some embodiments, the inquiry is received via email or another messaging service in response to an initial and potentially routinely scheduled machine generated security report. The inquiry provided by the user can be in response to questions that are raised by the contents of the initial report and be submitted as a natural language inquiry using a human language. This interactive approach to dynamic and adaptive report generation allows the user to gain deeper insights and understanding on security issues. For example, after reviewing an initial security report, a user inquiry can request a follow-up report that provides additional details on specific areas of concern, ranks current trends for a specified subgroup of users, or provides historical metrics for identified targets, etc. The scope of the inquiry can be limited to the initial report or expand to cover any data to which the user can access. Moreover, the user can participate in multiple rounds of inquiries, including multiple iterative rounds of inquiries, to refine existing and/or address additional security concerns including ones that are not apparent from previous reports.

In the context of security systems, as information technology systems become more complex and threats against them become more complex and frequent, the ability to highlight and extract critical information becomes increasingly challenging and important. The disclosed techniques and systems address these concerns by providing users with an efficient and effective interactive interface for automatically generating responsive security reports. A user, such as a chief security officer or another information security personnel, can easily and quickly surface the most critical and relevant security issues, providing the user with a more complete and in-depth view of the relevant security landscape. For example, instead of requiring users to individually dive into dashboards and/or construct complex queries to extract relevant metrics, a report responsive to a user inquiry is automatically generated. With no additional user demands, the disclosed security reporting service can perform the steps to understand the intent or objective of the user inquiry, retrieve the relevant and required data necessary to respond to the inquiry, and synthesize results addressing the inquiry into a responsive report with both visual and descriptive elements. The responsive report addresses the user inquiry and can be easily shared with others in the organization.

In some embodiments, a report message including a machine generated security report is provided. For example, a report message can be routinely scheduled to provide a machine generated security report updating a security user on security issues. The machine generated security report can be customized for the user, for example, based on user preferences including the relevant industry, frequency of reporting, and monitored information technology infrastructure. To encourage the user to interact with the report, the contents of the report can include example inquiries and topics that are available for the user to explore. In some embodiments, a reply message to the report message is received, wherein the reply message includes an inquiry. For example, after reviewing the report, a user can respond via a messaging platform such as via email with an inquiry requesting additional information. The inquiry can be based on issues raised in the report or based on the user's access to security information within the security system. Rather than requiring the user to log into one or more different systems and manually extract information such as traffic metrics, user account activity, software and hardware configurations, and other analytics, the inquiry can encapsulate the user's request and utilize a human natural language.

In some embodiments, data associated with the inquiry and determined to be accessible with a security privilege of a sender of the reply message is retrieved. For example, a security reporting system authenticates the reply message and associated sender. Based on the sender's security access, only data relevant to the inquiry and accessible to the sender is retrieved. In some embodiments, the retrieved data can span multiple data sources including data sources for different systems. In some embodiments, a machine learning language model query using the retrieved data and at least a portion of the machine generated security report is automatically generated. For example, a machine learning language model is provided with a context that can include at least a portion of the initial generated security report and the relevant retrieved data. In some embodiments, the model is also provided with at least a portion of the inquiry. The model can be provided with the context in the format of a machine learning language model query. In some embodiments, a second report generated by a machine learning language model executed in response to the machine learning language model query is received. For example, using the machine learning language model, a responsive report is generated based on the prompted query with the provided context. In some embodiments, the report generation process utilizes multiple models, such as models for different subject domains, and the second report is generated based on the responses of different component models. In some embodiments, the second report in a responsive message from an artificial intelligence service is provided as a response to the reply message. For example, once the second report is generated and validated, the second report is automatically provided to the sender in response to the sender's reply message. In some embodiments, the second report is emailed to the sender as part of an email chain in response to the sender's reply message. For example, the security reporting system functions as an artificial intelligence security reporting service that receives the user's initial reply email with the user inquiry, automatically generates a responsive report, and replies to the user's initial reply email with a responsive email that includes the generated responsive report.

FIG. 1 is a block diagram illustrating an embodiment of a computing infrastructure for an artificial intelligence (AI) security reporting service. In the example shown, clients 101, 103, and 105 are network clients configured to use artificial intelligence (AI) security reporting service 141 via messaging service 131 to resolve client reporting requests. Clients 101, 103, and 105 are communicatively connected to messaging service 131 via network 121, and messaging service 131 is communicatively connected to AI security reporting service 141. Network 121 can be a public or private network. In some embodiments, network 121 is a public network such as the Internet. AI security reporting service 141, utilizing large language model (LLM) services 151 and data stores 161, provides machine generated security reports that are initiated and delivered via messaging service 131. For example, a user can receive a security report at clients 101, 103, or 105, and respond to the received security report with a request for a new report. The request can be initiated as a message, such as a reply email message that is sent via messaging service 131 to AI security reporting service 141. AI security reporting service 141 generates a responsive report using LLM services 151 and data stores 161. The responsive report is then delivered to the requester, such as a user of clients 101, 103, or 105, via messaging service 131.

In some embodiments, clients 101, 103, and 105 are each a network client device for interfacing with security services including AI security reporting service 141. Clients 101, 103, and 105 have network access via network 121 and can utilize messaging service 131 to send and receive messages. In some embodiments, clients 101, 103, and 105 utilize an application client such as an email application to communicate with messaging service 131. In some embodiments, the users of clients 101, 103, and 105 can correspond to information security personnel such as a chief security officer or another user with security responsibilities and access to the security services.

In some embodiments, messaging service 131 corresponds to one or more messaging platform servers that offer functionality for sending and receiving messages. The messaging format can include email, chat, direct message, etc. and the underlying systems can corresponds to email servers, collaborative messaging systems, and/or secure messaging systems, among others. In various embodiments, the messages sent via messaging service 131 can include descriptive messages as well as files such as security reports. For example, an email with a security report attachment can be delivered via messaging service 131. As another example, regular reports such as monthly security reports to clients 101, 103, and 105 can be distributed to users via messaging service 131. In some embodiments, messaging service 131 corresponds to a particular node of a messaging platform, such as an email server node, for interfacing with and/or routing messages to and from AI security reporting service 141. For example, messaging service 131 may be one of many distributed messaging servers that support a distributed messaging service. In the example shown, messaging service 131 is used for inbound and outbound messaging services such as to receive, deliver, and/or route messages for AI security reporting service 141.

In some embodiments, AI security reporting service 141 corresponds to one or more servers of a security service for generating customized security reports. For example, AI security reporting service 141 is an AI-enabled security reporting service that can receive a user security inquiry and generate a security report responsive to the inquiry. In some embodiments, the generated report is based on an initial report and the generated responsive report provides additional details and/or context for the initial report based on the provided inquiry. Although discussed herein as a security reporting service, AI security reporting service 141 is part of a security platform and provides security solutions such as threat detection, incident response, and/or security analytics, among other security solutions to detect, prevent, and/or respond to security threats. In various embodiments, access to AI security reporting service 141 is restricted to accounts with the proper security privileges. For example, generated reports are only provided to users with the proper account credentials and/or security access. In the example shown in FIG. 1, AI security reporting service 141 is accessed via the messaging service shown as messaging service 131. However, other methods of accessing AI security reporting service 141 may be appropriate as well, such as via a dashboard application, web interface, other messaging services, etc. but are not shown. Although not shown in FIG. 1, AI security reporting service 141 may be connected to network 121, for example, to access LLM services 151.

In some embodiments, LLM services 151 correspond to one or more different LLM services for generating machine learning language model results to machine learning language model queries. LLM services 151 may be first-party and/or third-party LLM services. For example, LLM services 151 may include one or more third-party services that are queried for LLM results allowing potentially expensive LLM queries to be performed by a third party to AI security reporting service 141. In some embodiments, one or more LLM services of LLM services 151 can be operated by the same party as AI security reporting service 141, for example, to utilize a specific domain model and/or to limit the access of security data to outside parties. In some embodiments, LLM services 151 may utilize both first-party and third-party services including using a first-party service to fine-tune third-party LLM results. As shown in FIG. 1 by the solid and dotted lines, LLM services 151 may be communicatively connected to AI security reporting service 141 via network 121. For example, LLM services 151 are accessed by AI security reporting service 141 via network 121.

In various embodiments, LLM services 151 are utilized by AI security reporting service 141 and are part of the report generation process for dynamically generating a report in response to a security inquiry. The context provided to LLM services 151 can include an initial or source security report, parts of a security inquiry, and/or data retrieved in response to the inquiry. In some embodiments, the context can include any portion of a multi-message conversation including generated reports attached to the messages. In some embodiments, LLM services 151 may be used to retrieve the data relevant to the inquiry, such as to generate database queries for extracting the data required for answering a security inquiry.

In some embodiments, data stores 161 are a collection of different data stores used by AI security reporting service 141. The data stores can include internal and external data stores. For example, internal data stores may be hosted by the same organization that hosts AI security reporting service 141, whereas external data stores can be hosted by a third-party and may be accessed via a third-party application programming interface (API). Data stores 161 can store data related to past security reports and/or past messages received and/or sent by AI security reporting service 141. In some embodiments, data stores 161 are used to store security data including security metrics, analytics, report templates, and/or configurations, among other security data. Although not shown in FIG. 1, data stores 161 may be alternatively or additionally connected to network 121, for example, and accessed via network 121.

Although single instances of some components have been shown to simplify the diagram of FIG. 1, additional instances of any of the components shown in FIG. 1 may exist. For example, messaging service 131 may be implemented by one or more messaging servers, AI security reporting service 141 may be similarly implemented by one or more AI security reporting servers, and LLM services 151 may be implemented by one or more LLM servers. Additionally, clients 101, 103, and 105 are example client devices for accessing and utilizing AI security reporting service 141. Although three clients are shown (clients 101, 103, and 105), many more additional clients can exist and access AI security reporting service 141. Similarly, data stores 161 can include additional data sources including distributed data store servers located at different network locations. In some embodiments, components not shown in FIG. 1 may also exist and/or the network configuration of the included components may differ from what is shown.

Figure 2:
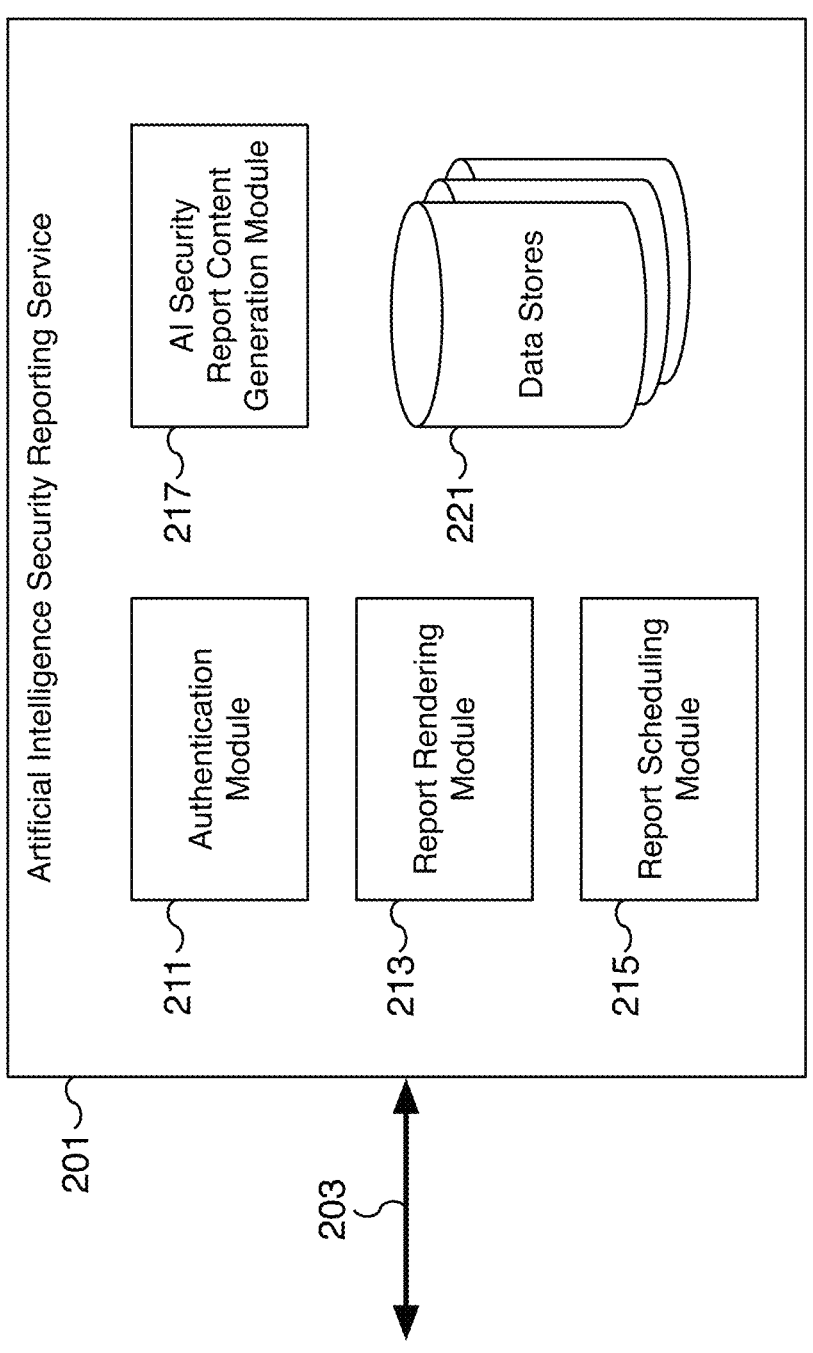
FIG. 2 is a block diagram illustrating an embodiment of an artificial intelligence (AI) security reporting service for generating security reports.

FIG. 2 is a block diagram illustrating an embodiment of an artificial intelligence (AI) security reporting service for generating security reports. In the example shown, artificial intelligence (AI) security reporting service 201 includes network connection 203, authentication module 211, report rendering module 213, report scheduling module 215, artificial intelligence (AI) security report content generation module 217, and data stores 221. In response to a security inquiry, AI security reporting service 201 can automatically generate a responsive report that includes dynamically retrieved content and synthesized results. In addition to the inquiry, the machine learning language model generated report can be based on an initial reference report and/or on security data accessible to the requester. In some embodiments, the generated report is based on automatically retrieving the relevant data for the report and generating a customized report for the requester based on a report template. In some embodiments, AI security reporting service 201 is AI security reporting service 141 of FIG. 1 and an inquiry is received from a client, such as clients 101, 103, and/or 105 of FIG. 1, via a messaging service such as messaging service 131 of FIG. 1. In some embodiments, the machine learning report generation utilizes one or more large language models such as a large language model (LLM) accessed via an LLM service such as LLM services 151 of FIG. 1.

In some embodiments, artificial intelligence (AI) security reporting service 201 is a security report generation service that can dynamically generate a security report to address a security inquiry. For example, a user can send an email with a security inquiry, such as a security question or request, and a responsive report will be generated that addresses the user's inquiry. In various embodiments, in response to a received inquiry, AI security reporting service 201 will first verify the sender of the inquiry has the proper access and then generate a responsive report. The generation can include retrieving the relevant data scoped to the sender's privileges and then synthesizing the report content. The content can then be rendered into a report format, such as a multi-slide report. In some embodiments, the generated report is responsive to both an inquiry and a reference report. In some embodiments, AI security reporting service 201 can be configured to send regular and/or scheduled reports, such as a daily, weekly, bi-weekly, monthly, quarterly, or another configured scheduling period.

In some embodiments, network connection 203 is a network connection used by AI security reporting service 201 to communicate with other services including to receive and respond to security report requests. For example, a request received via network connection 203 can include a security inquiry, a reference report, and an enclosing message such as an email message. In some embodiments, the enclosing message can include header information such as email headers and networking headers that can be utilized to authenticate and/or verify the identity of the sender. In various embodiments, network connection 203 can also be used to access additional services such as security report generation components or agents, data stores, and LLM services.

In some embodiments, authentication module 211 is a processing module for authenticating a user, such as a sender of a security inquiry. In various embodiments, the authentication process can vary depending on the method used to interface with AI security reporting service 201. For example, in response to an email request, authentication module 211 can verify the sender by analyzing the email headers and networking headers. In some embodiments, the user is authenticated via other techniques, such as via password-based, biometric, token-based, certificate-based, multi-factor, knowledge-based, and/or another technique of authentication. In various embodiments, authentication module 211 further determines the access privileges for a user, such as the scope of the security data and features the user can access and the scope of data that can be included in a generated report. For example, authentication module 211 can access an accounts data store such as an accounts data store of data stores 221 or an accounts service for retrieving user privileges.

In some embodiments, report rendering module 213 is a processing module for rendering a report and accompanying messages. For example, a generated report can include multiple pages such as multiple pages of presentation slides and an email enclosing the report. The generated report and enclosing email can be rendered using a report and messaging template, such as a template of a slide used to help position synthesized content responses and an email template for including the report as an attachment. For example, a slide template can require a title, a heading, two charts, and a description. As another example, another slide template can require a title, three charts, and a bullet point summary of the charts. In some embodiments, the template is described via a prompt, such as a large language model prompt. In various embodiments, the context used by report rendering module 213 can include the security content and synthesized results from artificial intelligence (AI) security report content generation module 217, and the provided content can be formatted using a non-visual format. Report rendering module 213 can render the report into a visual digital report with visual graphics such as images, photos, charts, figures, and/or diagrams, etc. In some embodiments, report rendering module 213 is implemented as a service and/or is accessed via an application programming interface (API).

In some embodiments, report scheduling module 215 is a processing module for scheduling generated reports. For example, AI security reporting service 201 can initiate the generation and sending of a security report in response to a scheduled trigger configured via report scheduling module 215. In some embodiments, report scheduling module 215 is configured to automate and/or routinely initiate the generation and sending of custom security reports to the appropriate users. For example, reports can be scheduled based on frequency and for a set of intended recipients. In various embodiments, report scheduling module 215 can seed the report generation with an inquiry, such as a prompt, topic, or narrative, used to define the generation parameters of the report. The reports can be configured to require certain information including types of slides and/or content. For example, the reports can be configured to include certain categories of slides such as content covering a company's threat landscape, the company's return on investment, ecosystem trends, historical reviews or data lookbacks based on time ranges, and/or the value framework for security solutions, among other categories. In some embodiments, the generated reports initiated by report scheduling module 215 are initiated separate from the reports generated in response to a received user security inquiry. For example, a report initiated by report scheduling module 215 may form the basis for a subsequent user inquiry used to generate a responsive report to the user inquiry.

In some embodiments, artificial intelligence (AI) security report content generation module 217 is a processing module for generating security report content. For example, using AI security report content generation module 217, content for a security report can be generated by one or more machine learning language models, and the generated content can be provided for rendering into a deliverable report by report rendering module 213. In some embodiments, AI security report content generation module 217 may be implemented by one or more report content generation components or reporting agents, each with their own dedicated focus or domain. For example, different report content generation components can be dedicated to generating different categories or types of content, such as content related to product strategy, account analytics, cybersecurity news and breaches, or security detection results, among other categories. Each report content generation component may be implemented separately based on its own configuration including its own configured data sources, default settings, requirements, etc. In some embodiments, the different report content generation components utilize one or more machine learning language models to assist in retrieving data for the report content and/or for synthesizing content results based on the retrieved data. In some embodiments, the report content generation components are each implemented as a different AI security reporting agent. In some embodiments, a report creation module of AI security report content generation module 217 manages the different report content generation components.

In some embodiments, data stores 221 are one or more data stores for security data including data related to previously generated reports, user account information, user messages and conversations, and/or other security data. For example, previous reports generated by AI security reporting service 201 can be indexed and stored in a report repository of data stores 221. In some embodiments, data stores 221 include an accounts data store used to store access privileges for users. The accounts data in data stores 221 can also include user specific account data used for report generation, such as data and/or metadata for a company logo, company name, a company common name, company colors and/or themes, one or more company report templates, etc. In some embodiments, data stores 221 can also include a conversation or messages data store used to archive past communication with users.

Figure 3:
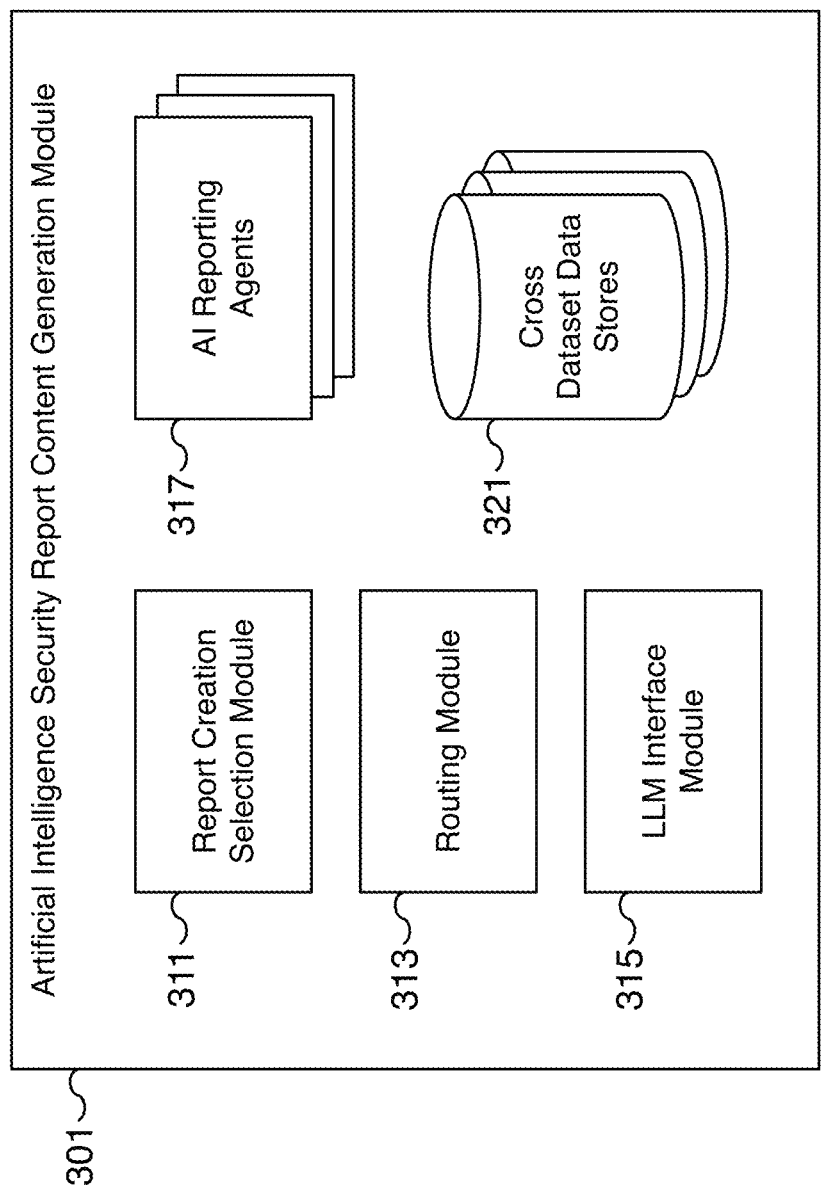
FIG. 3 is a block diagram illustrating an embodiment of an artificial intelligence (AI) security report content generation module.

FIG. 3 is a block diagram illustrating an embodiment of an artificial intelligence (AI) security report content generation module. In the example shown, artificial intelligence (AI) security report content generation module 301 includes report creation selection module 311, routing module 313, large language model (LLM) interface module 315, artificial intelligence (AI) reporting agents 317, and cross dataset data stores 321. In various embodiments, report creation selection module 311 of AI security report content generation module 301 receives a request to generate content for a security report and utilizes routing module 313 to route requests for different forms of content to be generated by different agents of artificial intelligence (AI) reporting agents 317. Report creation selection module 311 and/or AI reporting agents 317 can further utilize LLM interface module 315 to access LLM services for various report generation steps such as for generating queries to retrieve applicable data for a security report, synthesizing content based on the retrieved data, ensuring a consistent format and tone of the generated content, and/or validating the generated content results, among other steps.

In some embodiments, AI security report content generation module 301 is utilized by an AI security reporting service such as AI security reporting service 141 of FIG. 1 and/or AI security reporting service 201 of FIG. 2. In some embodiments, one or more of the components of the AI security reporting service are implemented as part of AI security report content generation module 301 and/or one or more of the components of AI security report content generation module 301 are implemented as part of the AI security reporting service. For example, although report rendering functionality is described as a component of AI security reporting service 201 of FIG. 2, the rendering functionality could be alternatively or additionally implemented as part of AI security report content generation module 301.

In some embodiments, report creation selection module 311 receives and processes a request to generate content for a security report. For example, a received request to generate content for a security report can include an inquiry, such as a user inquiry related to a security question, data related to the inquiry, and/or one or more references related to the inquiry such as a previous generated report. The received inquiry is processed and analyzed to determine how to best respond to the inquiry including what types of content to select and include in a responsive report. In some embodiments, a report template is utilized that can assist in selecting the types of content for pages or slides to include in a report. In various embodiments, a security report inquiry is analyzed to determine the intent or objective of the inquiry. A framework for the report can be created that includes multiple selected sections of content. The content for each selected section can be addressed and fulfilled by a reporting agent. In various embodiments, report creation selection module 311 utilizes routing module 313 to distribute and route the creation of the different selected content sections to one or more different reporting agents and then subsequently collects and organizes the generated results. In some embodiments, report creation selection module 311 provides the collected and organized security content generated by different reporting agents for rendering into a final digital report. In some embodiments, the generated security content is formatted using a structured descriptive format such as JavaScript Object Notation (JSON) or another data format that can be used by a report rendering module for rendering the report content into a digital report format. For example, the generated security content is formatted using a non-visual format that can be later rendered into a visual digital report format.

In some embodiments, routing module 313 is a processing module for routing content generation requests to the appropriate reporting agents of AI reporting agents 317. For example, the contents of a report can include multiple content sections, each with content specifically generated for a content section. Using routing module 313, a request to generate a specific type of content for a content section is routed to the appropriate reporting agent configured for that type (or category) of content. By supporting different reporting agents, content can be generated based on content type such as category types related to product strategy, account analytics, cybersecurity news and breaches, and security detection results, among other categories. In some embodiments, routing module 313 routes both the requests for content generation and the responses with generated content between report creation selection module 311 and the reporting agents of AI reporting agents 317.

In some embodiments, LLM interface module 315 is a processing module for interfacing with LLM services. For example, an LLM can be queried with an LLM prompt using LLM interface module 315. In various embodiments, LLM interface module 315 allows AI security report content generation module 301 and its components, such as report creation selection module 311 and AI reporting agents 317, to utilize LLM-based results such as for the synthesis of security content, for enforcing tone and language utilized in the generated content, and for determining and retrieving the required content for addressing a security inquiry, among other tasks. For example, a reporting agent of AI reporting agents 317 can utilize LLM interface module 315 to determine a query tool for accessing data of cross dataset data stores 321. The LLM result can include a generated database query which selects the appropriate fields of a selected database table to retrieve relevant data used for addressing a security-related inquiry. In some embodiments, the machine learning language models interfaced using LLM interface module 315 correspond to LLM services 151 of FIG. 1.

In some embodiments, AI reporting agents 317 are a collection of reporting agents designed to generate specific types or categories of security content. Each agent can be customized to generate unique content and may be configured to access a unique set of data sources of cross dataset data stores 321. In some embodiments, each agent of AI reporting agents 317 can utilize LLM interface module 315 to query its configured data sources and datasets of cross dataset data stores 321 to retrieve and synthesize content for a section of a security report. The different reporting agents of AI reporting agents 317 can be configured and/or optimized for generating different types of content. The different types of content can include content on product strategy, account analytics, cybersecurity news and breaches, and security detection results, among other content types or categories. Moreover, the different agents may require different query tools and searches for accessing their different configured data sources and datasets of cross dataset data stores 321. For example, a product strategy agent for generating product and strategy content may utilize vector searches for accessing manually curated content, an account analytics agent may utilize database queries for accessing pre-computed analytics tables, a cybersecurity news and breaches agent may utilize vector searches for accessing curated news and analysis data sources, and a security detection agent may utilize a custom application programming interface (API) for accessing security detection data captured by a security platform.

In some embodiments, cross dataset data stores 321 corresponds to one or more datasets and data sources accessible for security report content generation. Cross dataset data stores 321 can include databases and their tables that contain security-related data including human-curated security content, curated news and analysis content, security detection data, and analytics data including metrics and trends data, among other security content information. The datasets and data sources of cross dataset data stores 321 may utilize different data structures, formats, and layouts for storing their data and may not be universally accessible by all AI reporting agents 317. For example, different agents of AI reporting agents 317 may be configured to access a different set of data sources of cross dataset data stores 321.

In some embodiments, the data accessible via cross dataset data stores 321 is managed and organized with certain techniques that can significantly improve analysis and retrieval results. For example, the data of different data sources and datasets of cross dataset data stores 321 can be organized to improve the efficiency and effectiveness of querying the data using a machine learning language model generated query. In some embodiments, database tables and fields are named to improve the quality of AI generated data queries by including meaningful and descriptive column names, minimizing the use of abbreviations and acronyms, using normalized data, using well-defined and consistent data types, and/or adding metadata to database fields, among other techniques.

Figure 4:
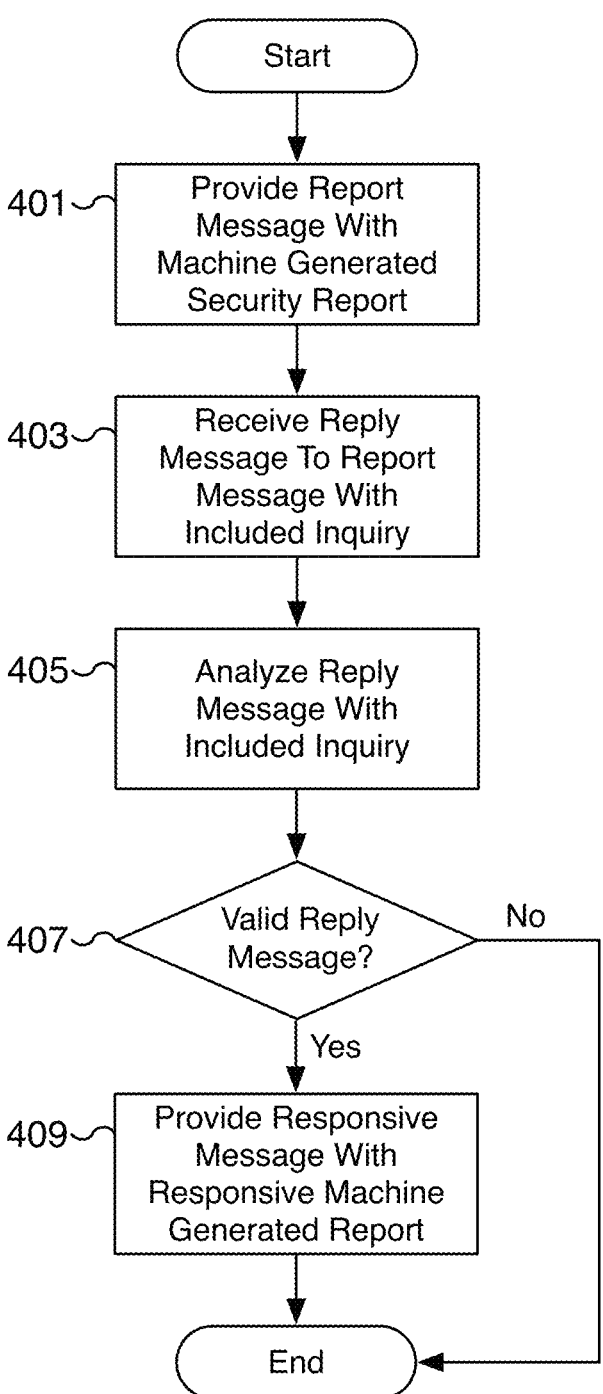
FIG. 4 is a flow chart illustrating an embodiment of a process for automatically generating a security report responsive to a security inquiry.

FIG. 4 is a flow chart illustrating an embodiment of a process for automatically generating a security report responsive to a security inquiry. For example, using the process of FIG. 4, an artificial intelligence (AI) security reporting service can respond to a received inquiry with a responsive security report generated using a machine learning language model. The received inquiry can be initiated from a message, such as an email message, that includes a reference report and the inquiry can relate to the contents included in the reference report. In some embodiments, the responsive report is scoped to the security privileges of the requester, such as the sender of the security inquiry, and may not be limited to the contents of a reference report. In some embodiments, the process of FIG. 4 is performed by an AI security reporting service such as AI security reporting service 141 of FIG. 1 and/or AI security reporting service 201 of FIG. 2. In some embodiments, the inquiry is received via a messaging service such as messaging service 131 of FIG. 1.

At 401, a report message is provided with a machine generated security report. For example, an initial security report is machine generated for a recipient. The report can be customized for the recipient and can follow a narrative template and include required content sections including sections machine generated from human curated content. The generated report can be an automated report, such as a report sent to the recipient as part of a scheduled routine. In various embodiments, the generated security report is enclosed in a report message, such as an email message, introducing the report and enclosing the report as an attachment. In some embodiments, the report is attached as a link, such as a hyperlink to a hosted digital version of the report. In various embodiments, the report message and/or the generated report can include suggestions including examples of suggested security inquiries for interactively generating a responsive report. For example, the report message and/or generated report can be seeded with conversation starters to help prompt an inquiry.

At 403, a reply message to the report message is received with an included inquiry. For example, a reply message such as an email message with a security inquiry is received. In some embodiments, the reply message is received via a messaging service and forwarded to the AI security reporting service. The included inquiry can be a security inquiry asking about additional security related details. For example, an inquiry can ask questions in a natural language such as "What're the most attacked departments?," "What about the high risk vendors in the past 4 quarters?," or another inquiry constructed in a natural language format. In some embodiments, the inquiry is multiple sentences and may reference an initial report, such as the machine generated security report provided at 401.

At 405, the reply message with the included inquiry is analyzed. For example, the reply message received at 403 is analyzed to determine whether the sender of the reply message is authorized to initiate the generation of a responsive report, such as whether the sender has the appropriate security privileges. In some embodiments, the headers of the reply message including networking and/or email headers are analyzed to determine the validity of the reply message and whether to further analyze and respond to the included inquiry. In analyzing the included inquiry, the AI security reporting service can perform steps to understand the intent or objective of the user inquiry and initiate the generation of a responsive report that addresses the questions and/or requests raised by the inquiry.

At 407, a determination is made whether the reply message is valid. For example, the reply message is analyzed at 405 to determine whether the sender of the reply message is authorized to initiate the generation of a responsive report. In various embodiments, the reply message can be analyzed to confirm the security privileges of the sender and, accordingly, whether the reply message is a valid reply message that can initiate generation of a responsive report. In the event the reply message is valid, processing proceeds to 409 where a responsive report is generated. In the event the reply message is not valid, processing completes, and no responsive report is generated. In some embodiments, an error response can be returned in response to the reply message and/or the reply message is reanalyzed, for example, by looping back to step 407, to attempt to validate the reply message on an additional iteration such as with a generative AI validation model. In some embodiments, alternative processing can be performed in the event the reply message is not valid, such as providing a demonstration mode for responsive report generation that does not require access and/or security privileges.

At 409, a responsive message is provided with a responsive machine learning language model generated security report. For example, a responsive message such as an email message is provided to the sender of the reply message received at 403. The responsive message includes a responsive security report generated by a machine learning language model. In various embodiments, the responsive report is automatically generated and may include multiple report sections, each with content generated by a machine learning language model. The different content of the sections can be generated by different reporting agents, each with access to a different subset of cross dataset data sources. In some embodiments, the final report is validated with a machine learning language model such as via a large language model service. For example, the final responsive report can be validated to ensure the same or appropriate tone is used throughout the content and that the contents of the report are accurate and scoped for the intended recipient.

Figure 5:
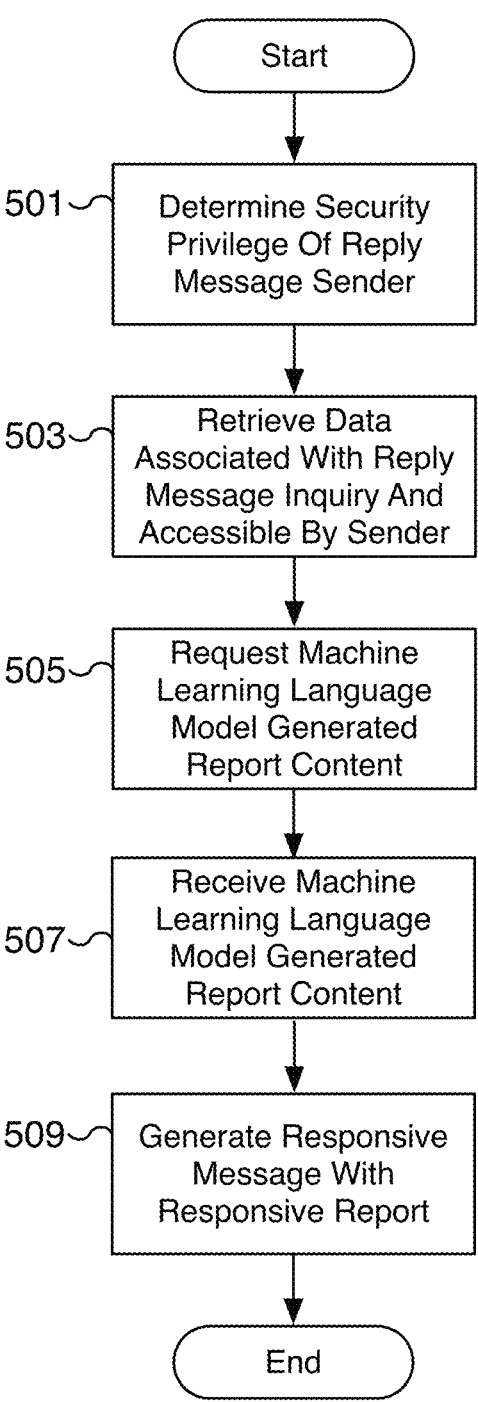
FIG. 5 is a flow chart illustrating an embodiment of a process for automatically generating a security report responsive to a security inquiry.

FIG. 5 is a flow chart illustrating an embodiment of a process for automatically generating a security report responsive to a security inquiry. For example, using the process of FIG. 5, an artificial intelligence (AI) security reporting service can respond to a received inquiry included in a reply message to an initial security report with a responsive message and security report generated using a machine learning language model. Based on a received security inquiry, the data retrieved and used to generate content for a security report is limited to and/or scoped to the security privilege of the sender. A responsive message with the generated report is then provided to address the received inquiry. In some embodiments, the process of FIG. 5 is performed at 405, 407, and/or at 409 of FIG. 4 by an AI security reporting service such as AI security reporting service 141 of FIG. 1 and/or AI security reporting service 201 of FIG. 2. In some embodiments, the inquiry is received via a messaging service such as messaging service 131 of FIG. 1.

At 501, the security privilege of the reply message sender is determined. For example, the identity of the sender of the reply message containing a security inquiry is determined. In some embodiments, the message headers and/or networking headers are analyzed to confirm the identity of the sender and the sender's access and/or security privileges are determined. In some embodiments, the sender is authenticated using an authentication module such as authentication module 211 of FIG. 2.

At 503, data associated with the reply message inquiry and accessible by the sender is retrieved. For example, a query approach is determined and used to retrieve data for generating content for a security report. The retrieved data is based on the inquiry in the received reply message and is scoped based on the security privilege of the sender determined at 501. For example, the data retrieved cannot include data that the sender is not authorized to access. In some embodiments, the retrieved data is also based on a report referenced by the inquiry. For example, an inquiry can request additional details on a particular portion, such as a particular figure or slide, of a previously generated security report. In some embodiments, the data is retrieved by an AI reporting agent such as a reporting agent of AI reporting agents 317 of FIG. 3 from a cross dataset data store such as cross dataset included in cross dataset data stores 321 of FIG. 3. For example, the AI security reporting service can utilize one or more AI reporting agents for retrieving the appropriate security content via an AI security report content generation module such as AI security report content generation module 217 of FIG. 2 and/or AI security report content generation module 301 of FIG. 3.

At 505, report content generated using a machine learning language model is requested. For example, one or more large language model (LLM) services are used to request the generation of security content for creating a security report. In some embodiments, the generation request corresponds to an LLM prompt such as a generative AI prompt and the provided LLM context associated with the prompt includes at least a portion of the security inquiry, a reference report if applicable, and/or the data retrieved at 503. In some embodiments, the provided LLM context extends across messages to include any portions of a conversation of messages including up to all back-and-forth messages on a topic between a user and the AI security reporting service. In some embodiments, the request is initiated by one or more AI reporting agents. For example, based on the requested content, different AI reporting agents are utilized and the different agents may each interface with LLM services independently.

At 507, report content generated using a machine learning language model is received. For example, report content is received in response to the request initiated at 505. In some embodiments, the received content can correspond to content for different sections of a security report, and the provided portions of report content can be provided by different AI reporting agents. In some embodiments, the received content is analyzed and validated before compiled into a final report. For example, the content can be verified as accurate to prevent LLM hallucinations and/or the inclusion of data that is outside of the allowed security scope, and/or the style of the content can be modified to enforce a desired style such as desired tone.

At 509, a responsive message with a responsive security report is generated. For example, a digital security report is rendered using the data retrieved at 503 and the content generated at 507. In some embodiments, the report is generated using a report template, such as a template that defines a presentation and/or layout framework and specific content sections. In addition to the security report, a responsive message such as an email message is generated for sending the report. In various embodiments, the responsive message and report can be rendered into their respective digital formats based on configuration settings for the recipient. For example, the message and report can be customized based on configuration templates to include the recipient's company logo, name, and presentation themes, company colors, etc. In some embodiments, the rendering is performed by report rendering module 213 of FIG. 2. In some embodiments, the responsive email is generated using a machine learning language model such as via LLM services 151 of FIG. 1.

Figure 6:
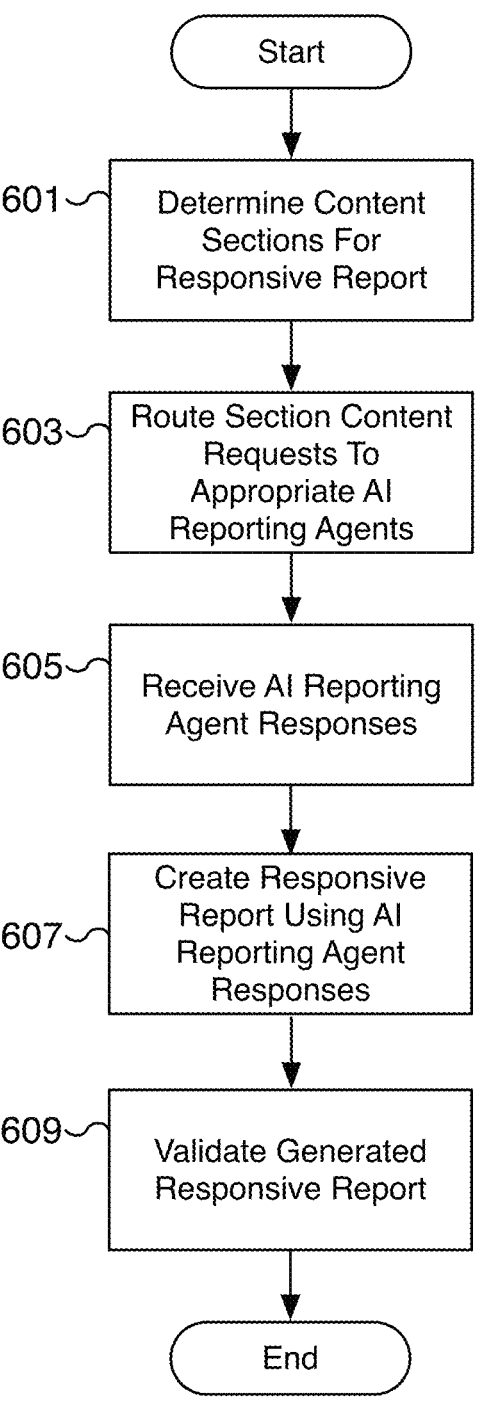
FIG. 6 is a flow chart illustrating an embodiment of a process for automatically generating content-specific security report content.

FIG. 6 is a flow chart illustrating an embodiment of a process for automatically generating content-specific security report content. For example, using the process of FIG. 6, an artificial intelligence (AI) security reporting service can utilize different AI reporting agents to generate different content-specific security report content. Each reporting agent can be configured with access and parameters to generate a different type of content, such as content for different security categories or areas. In some embodiments, the process of FIG. 6 is performed at 405, 407, and/or at 409 of FIG. 4 and/or at 503, 505, 507, and/or 509 of FIG. 5 by an AI security reporting service such as AI security reporting service 141 of FIG. 1 and/or AI security reporting service 201 of FIG. 2 and/or by an AI security report content generation module such as AI security report content generation module 217 of FIG. 2 and/or AI security report content generation module 301 of FIG. 3.

At 601, content sections for a responsive security report are determined. For example, the different sections required for a report responsive to a security inquiry are determined. In some embodiments, the inquiry is first analyzed to determine an objective and/or intent and then the appropriate sections are determined. Different example sections can include sections with content sourced from human-curated security content, curated cybersecurity news and analysis content, security detection results, and analytics data including security metrics and trends data, among other content. In some embodiments, the different sections required are determined by a report creation selection module such as report creation selection module 311 of FIG. 3.

At 603, section content requests are routed to the appropriate AI reporting agents. For example, based on the selection of sections determined at 601, requests for section content are routed to the corresponding AI reporting agents. By utilizing different reporting agents, the content for the different sections can be customized and tailored for a particular domain. Additionally, the data accessible for the content section can be limited to the appropriate data, such as data scoped by security access and/or data curated by humans specifically for the content domain. In some embodiments, by customizing and limiting the scope of each AI reporting agent, the context required for machine learning processing is contained allowing for significantly improved performance, efficiency, and costs when generating security report content using a machine learning language model. In some embodiments, section content requests are routed by a routing module such as routing module 313 of FIG. 3 to AI reporting agents such as AI reporting agents 317 of FIG. 3.

At 605, responses from AI reporting agents are received. For example, the content generated by the AI reporting agents is received. In some embodiments, the content is generated using a machine learning language model such as a machine learning language model accessed via a large language model (LLM) service. In some embodiments, the LLM service corresponds to LLM services 151 of FIG. 1. In some embodiments, the LLM service is used to retrieve and query the data and then to synthesize the data into content results. For example, the LLM can be used to generate a query and then the query can be executed to retrieve relevant data. The retrieved data can then be used by the AI reporting agent with an LLM service to generate results for a section of a security report. In some embodiments, the retrieved data is stored in data stores accessible by the AI reporting agents such as cross dataset data stores 321 of FIG. 3.

At 607, a responsive report is created using the AI reporting agent responses. For example, a responsive security report is created by combining the responses from the different AI reporting agents. In some embodiments, multiple different agents are used although a single agent can be utilized as well depending on the requirements of the inquiry. For example, for a report with multiple sections, the responses from each AI reporting agent may be used to create the different sections of a report. In some embodiments, the report may be rendered at step 607 and/or outputted into a descriptive format, such as JavaScript Object Notion, for rendering at a later step. In some embodiments, the content is analyzed for consistent style, such as consistent tone, tense, voice, structure, and/or other properties of the content. In some embodiments, the different sections are combined by a report creation selection module such as report creation selection module 311 of FIG. 3.

At 609, the generated responsive report is validated. For example, the contents of the generated report can be validated to ensure the accuracy of the contents. In some embodiments, the contents are validated to confirm that no data or content has been hallucinated by a machine learning language model. The content can also be validated to confirm that contents do not include data that should not be accessible and/or shared. For example, the contents of the security report can be validated to ensure compliance to security protocols. In some embodiments, the validation process is performed by a large language model (LLM) such as a validation model. In some embodiments, the LLM used for validation is an LLM accessible via LLM services 151 of FIG. 1.

Figure 7:
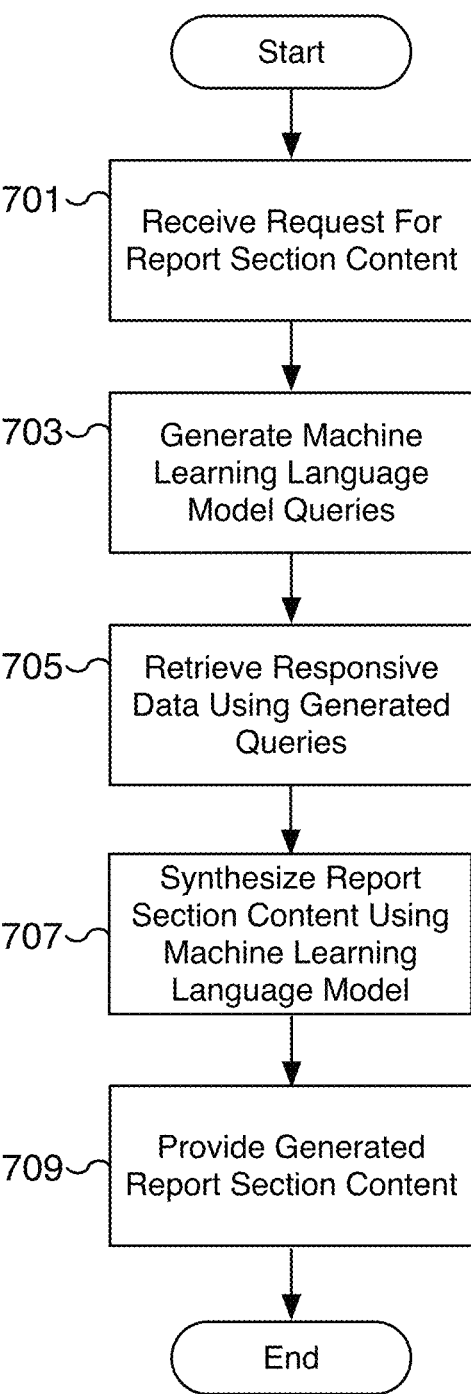
FIG. 7 is a flow chart illustrating an embodiment of a process for automatically generating section content for a security report using a machine learning language model.

FIG. 7 is a flow chart illustrating an embodiment of a process for automatically generating section content for a security report using a machine learning language model.

For example, using the process of FIG. 7, an artificial intelligence (AI) reporting agent can utilize a large language model (LLM) to generate content for a section of a security report. In some embodiments, the process of FIG. 7 is performed at 405, 407, and/or at 409 of FIG. 4, at 503, 505, 507, and/or 509 of FIG. 5, and/or at 603 and/or 605 of FIG. 6 by an AI security reporting service such as AI security reporting service 141 of FIG. 1 and/or AI security reporting service 201 of FIG. 2 and/or by an AI security report content generation module such as AI security report content generation module 217 of FIG. 2 and/or AI security report content generation module 301 of FIG. 3. In some embodiments, the machine learning language model is accessed via LLM services 151 of FIG. 1.

At 701, a request for report section content is received. For example, a request is received at an AI reporting agent to generate content for a section of a security report. The request can include a portion of the security inquiry serving as the basis for the report and any reference reports if applicable. In some embodiments, the request includes parameters for generating the section content, such as the scope and depth of the requested content.

At 703, machine learning language model queries are generated. For example, one or more machine learning language model queries are generated to retrieve data used for generating content for a section of a report. Based on the AI reporting agent, different data sources can be configured for accessing the relevant data for content generation, and one or more queries are generated that are specific for the configured data sources. In various embodiments, the queries are generated for specific query tools using a machine learning language model. For example, a machine learning language model can be used to generate vector searches for accessing a data source of manually curated product and strategy content. As another example, a machine learning language model can be used to generate database queries for accessing pre-computed analytics tables. Similarly, a machine learning language model can be used to generate application programming interface (API) calls for accessing security detection data captured by a security platform. Depending on the configured data sources, different machine learning language model queries are generated for retrieving relevant data for content generation.

At 705, responsive data is retrieved using generated queries. For example, data relevant to the report section is retrieved using the queries generated at 705. In some embodiments, the queries are formatted in a security-focused format and require translating into an executable format. For example, the queries generated at 703 can be generated in a format to minimize database attacks such as SQL injections and at 705, the generated query is converted into an SQL query for execution. In various embodiments, the queries are used to retrieve data from the appropriate data sources.

At 707, content for a report section is synthesized using a machine learning language model. For example, the content for a section is generated using a language model accessed via an LLM service. The context provided for the machine learning language model via the LLM service can include a portion of an initial security inquiry, any applicable reference reports, and the data retrieved at 705. In some embodiments, the report content is generated in response to a generative AI prompt and the prompt is constructed to enforce requirements of the AI reporting agent and for the generated report.

At 709, the generated content for the report section is provided. For example, the content generated by the machine learning language model via an LLM service is provided in response to the request received at 701. In some embodiments, the generated content is routed back to the requester where the content is merged with content from other AI reporting agents. In various embodiments, the provided content can be formatted using a structured descriptive format such as JavaScript Object Notation (JSON) or another data format that can be used to validate the contents and/or to render the report content into a digital report format. In some embodiments, the format used for the provided content is a non-visual format such as a text-based or binary encoded format that does not include rendered visuals such as visual graphics including images, photos, charts, figures, or diagrams, etc.

Figure 8A:
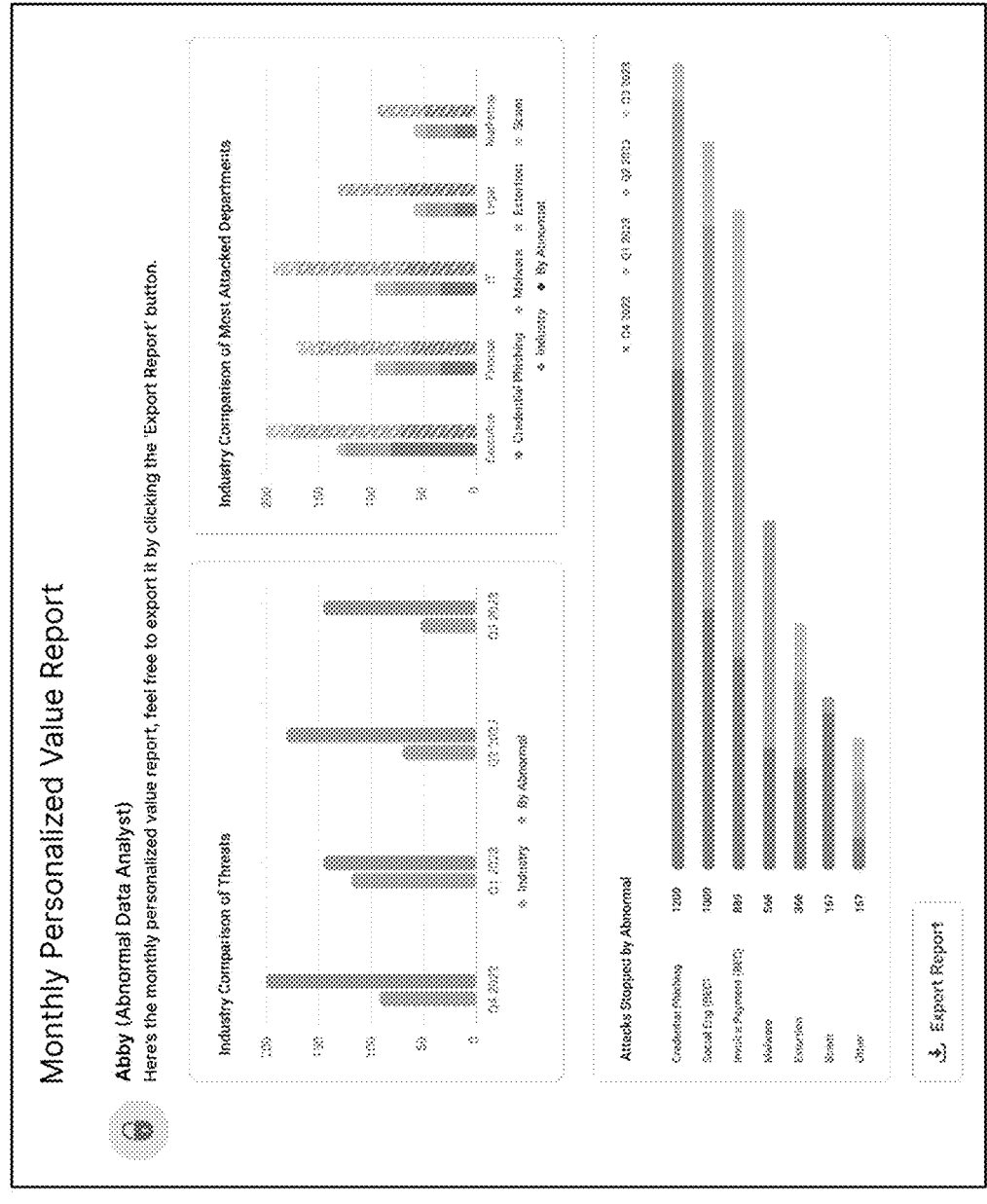
FIGS. 8A-C are examples of conversation messages that include security reports generated using an artificial intelligence (AI) security reporting service.
Figure 8B:
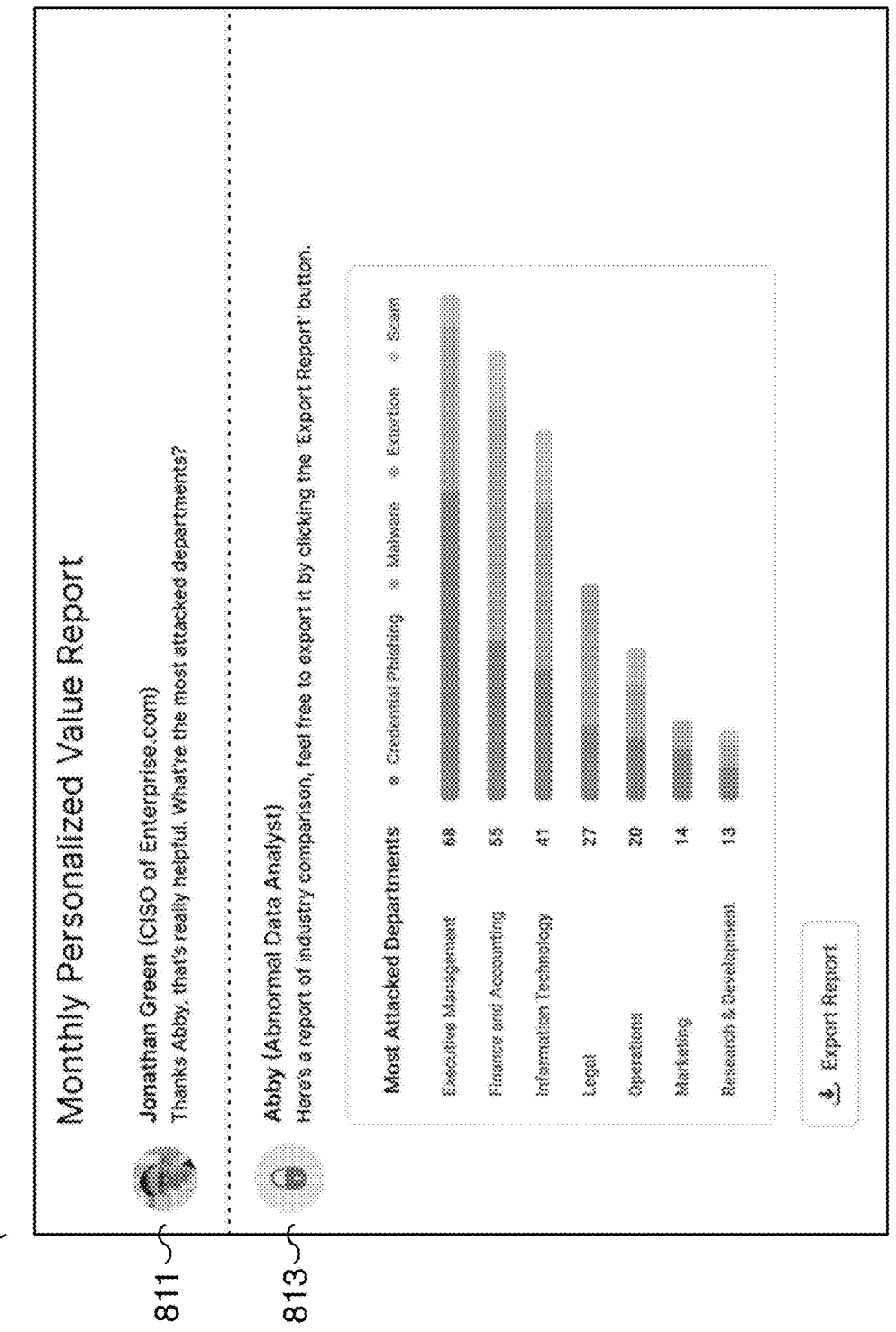
Figure 8C:
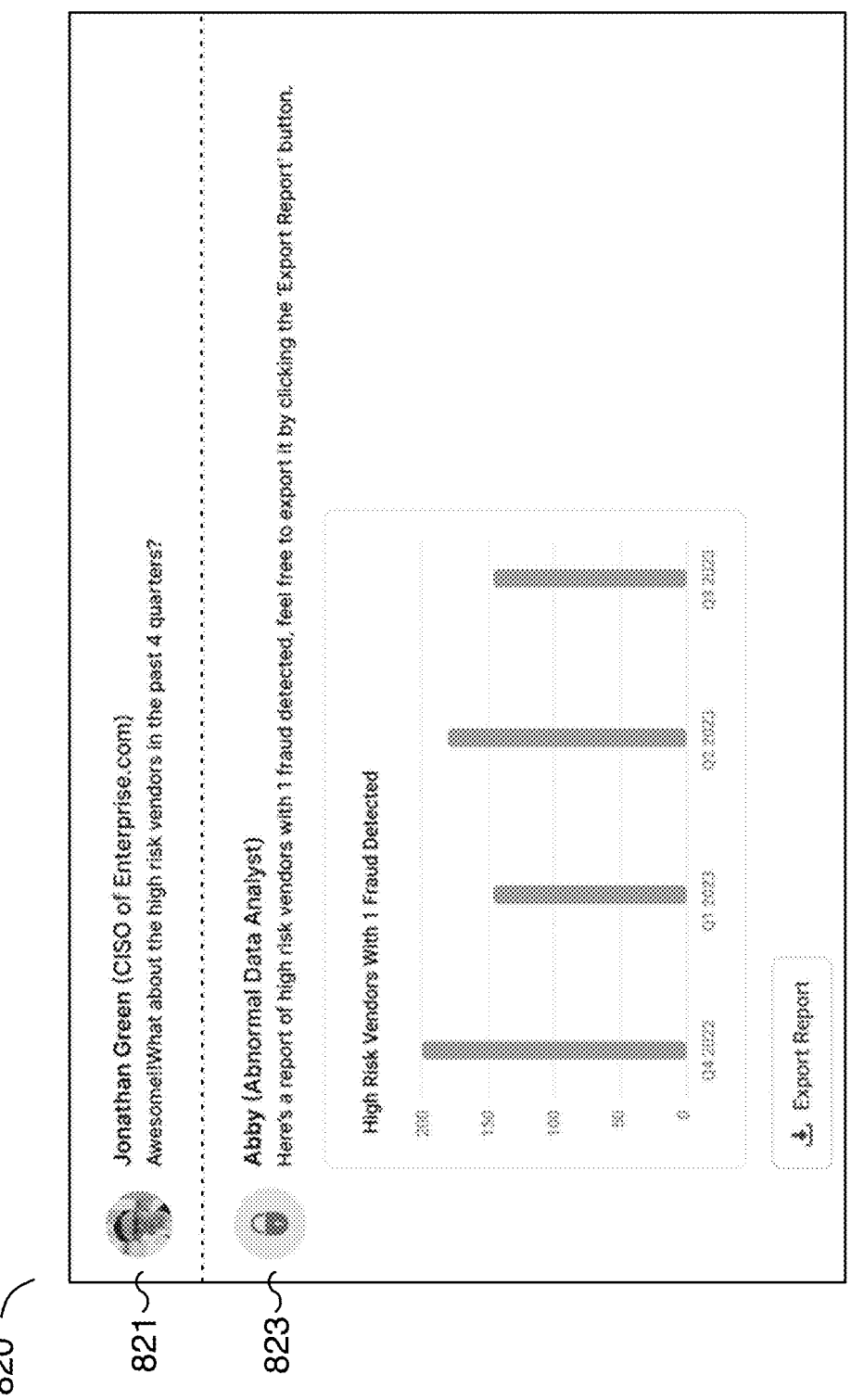

FIGS. 8A-C are examples of conversation messages that include security reports generated using an artificial intelligence (AI) security reporting service. As an example of the functionality enabled by the disclosed techniques and systems, message conversations 800, 810, and 820 of FIGS. 8A, 8B, and 8C, respectively, are a series of email messages that either include an initial security report or additional responsive security reports. The initial security report is included in message conversation 800 of FIG. 8A and an additional responsive report generated in response to a user security inquiry is included in message conversation 810 of FIG. 8B and message conversation 820 of FIG. 8C.

In the examples shown, message conversations 800, 810, and 820 of FIGS. 8A, 8B, and 8C, respectively, are generated as part of the processes of FIGS. 4-7 by an AI security reporting service. In some embodiments, the AI security reporting service is AI security reporting service 141 of FIG. 1 and/or AI security reporting service 201 of FIG. 2.

In the example of FIG. 8A, message conversation 800 corresponds to an automated email with an initial security report. The email of message conversation 800 is titled "Monthly Personalized Value Report" and the body of the email includes the content: "Here's the monthly personalized value report, feel free to export it by clicking the 'Export Report' button." followed with the attached initial security report. In some embodiments, only a portion of the initial security report is shown and the initial report includes additional content not shown. In various embodiments, the initial report is generated using a machine learning language model and can be constructed to follow a narrative that encourages additional email replies with security inquiries.

In the example of FIG. 8B, message conversation 810 includes reply message 811 and response message 813. Reply message 811 is a user email sent in response to the initial email of message conversation 800 of FIG. 8A. For example, in response to the initial security report, the user sends reply message 811 with the inquiry: "Thanks Abby, that's really helpful. What're the most attacked departments?" Here, the recipient "Abby" of reply message 811 refers to the AI security reporting service and the inquiry includes the question "What're the most attacked departments?," which is answered with the responsive security report of response message 813. In various embodiments, response message 813 is generated by the AI security reporting service and includes a rendered responsive message "Here's a report of industry comparison, feel free to export it by clicking the 'Export Report' button." followed with a generated responsive report. As shown in FIG. 8B, the responsive security report includes a chart of the most attacked departments.

The example of FIG. 8C demonstrates that the generation of responsive reports can be an interactive process, and that the context of an inquiry can span multiple messages within a conversation. Message conversation 820 includes second reply message 821 and second response message 823. Second reply message 821 is a user email sent in response to reply message 811 of FIG. 8B. For example, in response to receiving the responsive report of response message 813 of FIG. 8B, the user sends second reply message 821 with the inquiry: "Awesome!! What about the high risk vendors in the past 4 quarters?" The inquiry of second reply message 821 differs from the inquiry of reply message 811 of FIG. 8B, and a different AI reporting agent can be used to generate the responsive report of second response message 823. In various embodiments, second response message 823 is generated by the AI security reporting service using a selected AI reporting agent and includes a rendered responsive message "Here's a report of high risk vendors with 1 fraud detected, feel free to export it by clicking the 'Export Report' button," followed with a generated responsive report. As shown in FIG. 8C, the responsive security report includes a chart of high risk vendors with one fraud detected.

In some embodiments, the context of the inquiry in second reply message 821 can include at least the initial email of message conversation 800 of FIG. 8A, reply message 811 of FIG. 8B sent in response to the initial email of message conversation 800 of FIG. 8A, and response message 813 of FIG. 8B generated and sent in response to the inquiry included in reply message 811 of FIG. 8B. In some embodiments, the context further includes the associated generated reports, such as the reports of message conversation 800 of FIG. 8A and message conversation 810 of FIG. 8B. In some embodiments, the context is used to generate machine learning language model queries for generating the responsive report of second response message 823. Alternatively, in some embodiments, the context is reset for each new inquiry and the context includes only the information referenced along with an inquiry.

Figure 8D:
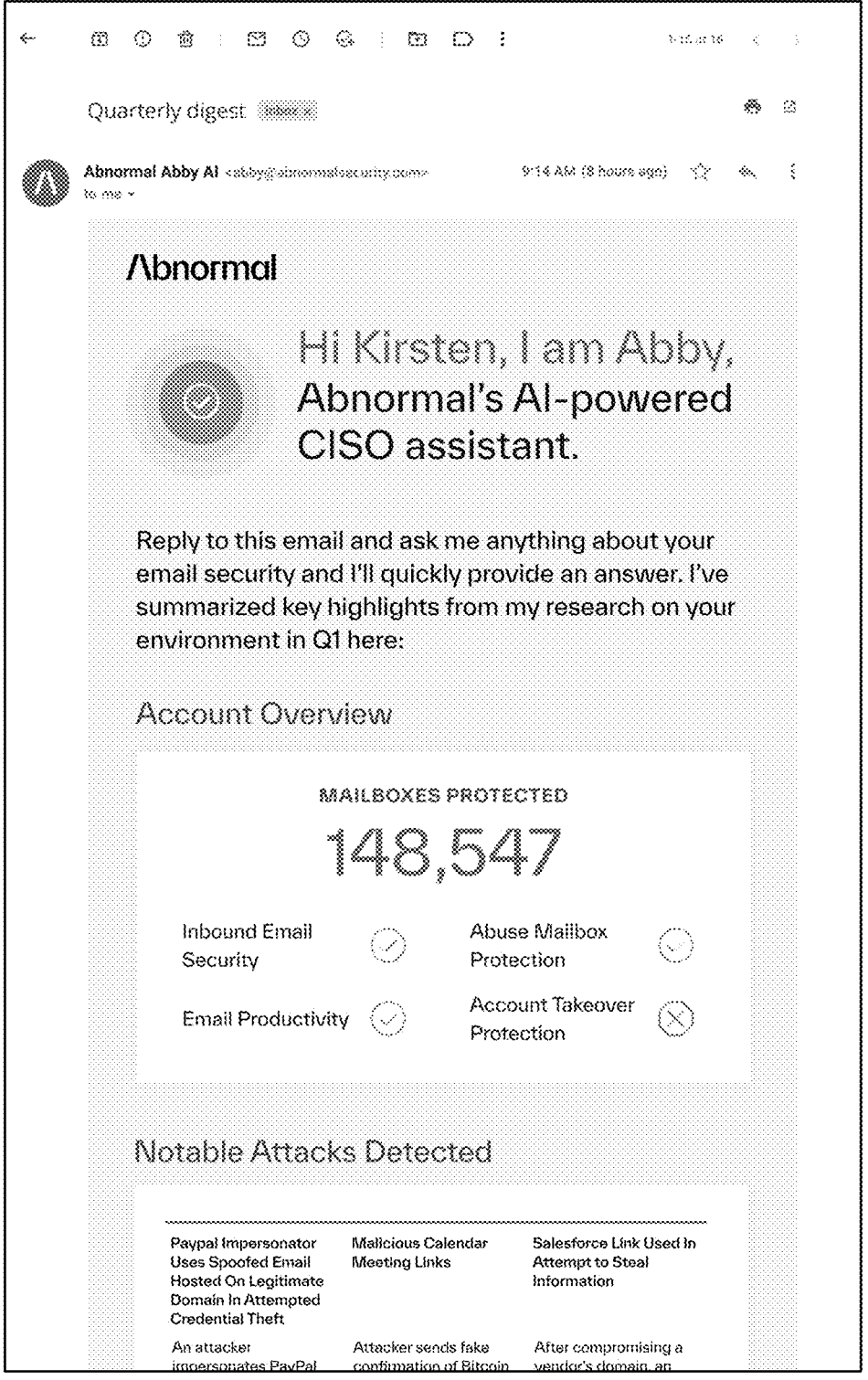
FIG. 8D is an example of an email message that includes an initial security report for encouraging follow-up security inquiries.

FIG. 8D is an example of an email message that includes an initial security report for encouraging follow-up security inquiries. For example, email message 830 is a routine security update message and can be generated using an artificial intelligence (AI) security reporting service. Email message 830 can be an automated and scheduled message. In the example shown, email message 830 is scheduled quarterly and is customized for the recipient. Email message 830 includes a generated security report with a narrative that encourages the user to respond with a reply message that includes security inquiries. In various embodiments, a reply message received in response to email message 830 includes a security inquiry that can be answered with a responsive security report. The responsive report is generated using the processes of FIGS. 4-7 by an AI security reporting service. The contents of the responsive report can be based on the inquiry included in the reply message and can reference the initial security report included in email message 830. In some embodiments, the AI security reporting service is AI security reporting service 141 of FIG. 1 and/or AI security reporting service 201 of FIG. 2.

Figure 9:
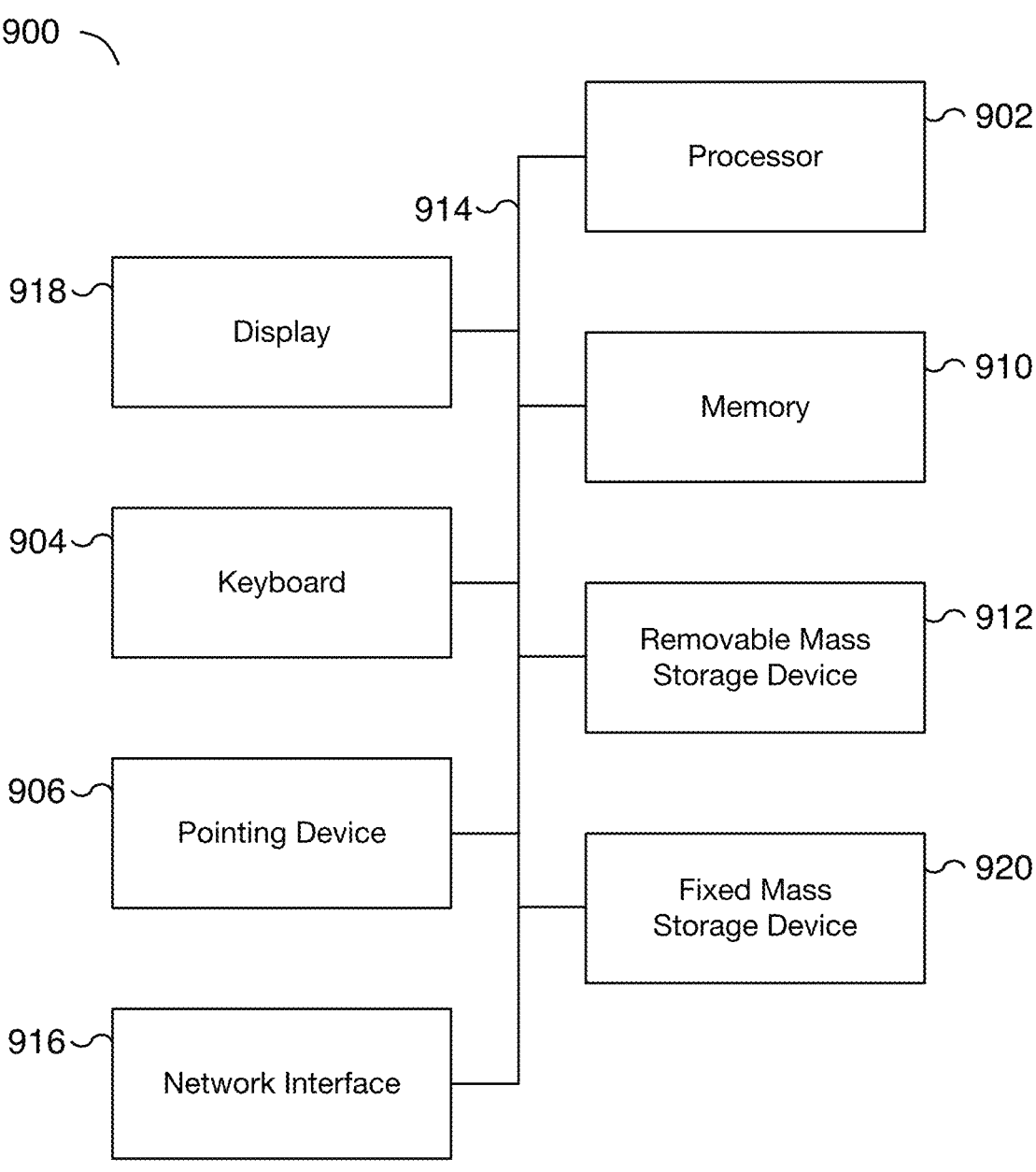
FIG. 9 is a functional diagram illustrating a programmed computer system for automatically generating responsive reporting.

FIG. 9 is a functional diagram illustrating a programmed computer system for automatically generating responsive reporting. As will be apparent, other computer system architectures and configurations can be utilized for the generation of responsive security reports. Examples of computer system 900 include clients 101, 103, and 105 of FIG. 1 and/or one or more computers of messaging service 131 of FIG. 1, artificial intelligence (AI) security reporting service 141 of FIG. 1, large language model (LLM) service 151 of FIG. 1, AI security reporting service 201 of FIG. 2, and/or AI security report content generation module 301 of FIG. 3.

Computer system 900, which includes various subsystems as described below, includes at least one microprocessor subsystem (also referred to as a processor or a central processing unit (CPU)) 902. For example, processor 902 can be implemented by a single-chip processor or by multiple processors. In some embodiments, processor 902 is a general purpose digital processor that controls the operation of the computer system 900. Using instructions retrieved from memory 910, the processor 902 controls the reception and manipulation of input data, and the output and display of data on output devices (e.g., display 918). In various embodiments, one or more instances of computer system 900 can be used to implement at least portions of the processes of FIGS. 4-7 and the functionality associated with the diagrams of FIGS. 8A-D.

Processor 902 is coupled bi-directionally with memory 910, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 902. Also as is well known in the art, primary storage typically includes basic operating instructions, program code, data and objects used by the processor 902 to perform its functions (e.g., programmed instructions). For example, memory 910 can include any suitable computer-readable storage media, described below, depending on whether, for example, data access needs to be bi-directional or unidirectional. For example, processor 902 can also directly and very rapidly retrieve and store frequently needed data in a cache memory (not shown).

A removable mass storage device 912 provides additional data storage capacity for the computer system 900, and is coupled either bi-directionally (read/write) or unidirectionally (read only) to processor 902. For example, storage 912 can also include computer-readable media such as magnetic tape, flash memory, PC-CARDS, portable mass storage devices, holographic storage devices, and other storage devices. A fixed mass storage 920 can also, for example, provide additional data storage capacity. The most common example of mass storage 920 is a hard disk drive. Mass storages 912, 920 generally store additional programming instructions, data, and the like that typically are not in active use by the processor 902. It will be appreciated that the information retained within mass storages 912 and 920 can be incorporated, if needed, in standard fashion as part of memory 910 (e.g., RAM) as virtual memory.

In addition to providing processor 902 access to storage subsystems, bus 914 can also be used to provide access to other subsystems and devices. As shown, these can include a display monitor 918, a network interface 916, a keyboard 904, and a pointing device 906, as well as an auxiliary input/output device interface, a sound card, speakers, and other subsystems as needed. For example, the pointing device 906 can be a mouse, stylus, track ball, or tablet, and is useful for interacting with a graphical user interface.

The network interface 916 allows processor 902 to be coupled to another computer, computer network, or telecommunications network using a network connection as shown. For example, through the network interface 916, the processor 902 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 902 can be used to connect the computer system 900 to an external network and transfer data according to standard protocols. For example, various process embodiments disclosed herein can be executed on processor 902, or can be performed across a network such as the Internet, intranet networks, or local area networks, in conjunction with a remote processor that shares a portion of the processing. Additional mass storage devices (not shown) can also be connected to processor 902 through network interface 916.

An auxiliary I/O device interface (not shown) can be used in conjunction with computer system 900. The auxiliary I/O device interface can include general and customized interfaces that allow the processor 902 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 9 is but an example of a computer system suitable for use with the various embodiments disclosed herein. Other computer systems suitable for such use can include additional or fewer subsystems. In addition, bus 914 is illustrative of any interconnection scheme serving to link the subsystems. Other computer architectures having different configurations of subsystems can also be utilized.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:

providing a report message including a machine generated security report;

receiving a reply message to the report message, wherein the reply message includes an inquiry;

retrieving data associated with the inquiry and determined to be accessible with a security privilege of a sender of the reply message;

automatically generating a machine learning language model query using the retrieved data and at least a portion of the machine generated security report;

receiving a second report generated by a machine learning language model executed in response to the machine learning language model query including by receiving content generated by the machine learning language model, formatting the received content generated by the machine learning language model into a non-visual format, and rendering the non-visual format into a visual digital report format; and providing as a response to the reply message, the second report in a responsive message from an artificial intelligence service.

2. The method of claim 1, wherein the reply message is an email message.

3. The method of claim 1, wherein retrieving the data associated with the inquiry and determined to be accessible with the security privilege of the sender of the reply message includes generating a data query using a second machine learning language model.

4. The method of claim 3, wherein the data query corresponds to a vector search, a database query, or an application programming interface (API) call.

5. The method of claim 1, further comprising analyzing one or more headers of the reply message to determine the security privilege of the sender.

6. The method of claim 1, wherein the report message including the machine generated security report is an automated and scheduled message.

7. The method of claim 1, wherein the retrieved data associated with the inquiry and determined to be accessible with the security privilege of the sender of the reply message includes at least one of a company logo, a company name, or company colors associated with the sender.

8. The method of claim 1, wherein the inquiry included in the reply message is a natural language inquiry.

9. The method of claim 1, further comprising:

receiving a second reply message in response to the responsive message, wherein the second reply message includes a second inquiry, and wherein a context of the second inquiry includes at least the report message, the reply message, or the responsive message.

10. The method of claim 9, wherein the context is used to generate the machine learning language model query for generating a second responsive report.

11. A system, comprising:

one or more processors; and a memory coupled to the one or more processors, wherein the memory is configured to provide the one or more processors with instructions which when executed cause the one or more processors to:

provide a report message including a machine generated security report;

receive a reply message to the report message, wherein the reply message includes an inquiry;

retrieve data associated with the inquiry and determined to be accessible with a security privilege of a sender of the reply message;

automatically generate a machine learning language model query using the retrieved data and at least a portion of the machine generated security report;

receive a second report generated by a machine learning language model executed in response to the machine learning language model query including by being configured to receive content generated by the machine learning language model, format the received content generated by the machine learning language model into a non-visual format, and render the non-visual format into a visual digital report format; and provide as a response to the reply message, the second report in a responsive message from an artificial intelligence service.

12. The system of claim 11, wherein the reply message is an email message.

13. The system of claim 11, wherein to retrieve the data associated with the inquiry and determined to be accessible with the security privilege of the sender of the reply message includes to generate a data query using second machine learning language model.

14. The system of claim 13, wherein the data query corresponds to a vector search, a database query, or an application programming interface (API) call.

15. The system of claim 11, wherein the memory is further configured to provide the one or more processors with instructions which when executed cause the one or more processors to: analyze one or more headers of the reply message to determine the security privilege of the sender.

16. The system of claim 11, wherein the report message including the machine generated security report is an automated and scheduled message.

17. The system of claim 11, wherein the retrieved data associated with the inquiry and determined to be accessible with the security privilege of the sender of the reply message includes at least one of a company logo, a company name, or company colors associated with the sender.

18. A computer program product, the computer program product being embodied in a non-transitory computer readable storage medium and comprising computer instructions for:

providing a report message including a machine generated security report;

receiving a reply message to the report message, wherein the reply message includes an inquiry;

retrieving data associated with the inquiry and determined to be accessible with a security privilege of a sender of the reply message;

automatically generating a machine learning language model query using the retrieved data and at least a portion of the machine generated security report;

receiving a second report generated by a machine learning language model executed in response to the machine learning language model query including by receiving content generated by the machine learning language model, formatting the received content generated by the machine learning language model into a non-visual format, and rendering the non-visual format into a visual digital report format; and providing as a response to the reply message, the second report in a responsive message from an artificial intelligence service.

19. The computer program product of claim 18, wherein the reply message is an email message.

20. The computer program product of claim 18, wherein retrieving the data associated with the inquiry and determined to be accessible with the security privilege of the sender of the reply message includes generating a data query using a second machine learning language model.

* * * * *